US012560011B2

(12) United States Patent
Jiang

(10) Patent No.: US 12,560,011 B2
(45) Date of Patent: *Feb. 24, 2026

(54) INTEGRATED HINGE STRUCTURE FOR PLASTIC BOARDS

(71) Applicant: YIXIANG BLOW MOLDING FURNITURE CO., LTD., Yuyao (CN)

(72) Inventor: Jinglei Jiang, Yuyao (CN)

(73) Assignee: YIXIANG BLOW MOLDING FURNITURE CO., LTD., Yuyao (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,494

(22) Filed: Nov. 6, 2023

(65) Prior Publication Data

US 2024/0068285 A1 Feb. 29, 2024

Related U.S. Application Data

(63) Continuation of application No. 17/553,592, filed on Dec. 16, 2021, now Pat. No. 11,846,130.

(30) Foreign Application Priority Data

Oct. 20, 2021 (CN) ........................ 202111219930.2

(51) Int. Cl.
*E05D 7/10* (2006.01)
*E05D 3/06* (2006.01)
*E05D 7/12* (2006.01)

(52) U.S. Cl.
CPC ............... *E05D 7/125* (2013.01); *E05D 3/06* (2013.01); *E05Y 2800/676* (2013.01)

(58) Field of Classification Search
CPC ....... Y10T 16/525; Y10T 16/548; E05D 1/00; E05D 1/02; E05D 1/06; E05D 9/005; E05D 7/00; E05Y 2800/68; E05Y 2800/344; E05Y 2800/676; E05Y 2800/678; E05Y 2900/602; B29L 2031/22; B29C 51/00; B29C 65/70; B29C 65/30; B29C 66/71;
(Continued)

(56) References Cited

U.S. PATENT DOCUMENTS 3,192,556 A * 7/1965 Himelreich ............... E05D 1/02
16/225
3,202,310 A * 8/1965 Tibbets ................. A45C 11/20
292/281

(Continued)

FOREIGN PATENT DOCUMENTS

GB 1261056 A * 1/1972
JP 2008087206 A * 4/2008

*Primary Examiner* — Chuck Y Mah
(74) *Attorney, Agent, or Firm* — 108550

(57) ABSTRACT

The present subject matter discloses an integrated hinge structure for plastic boards. The integrated hinge structure has a simplified design that is screw-free and convenient to assemble. It also has a relatively lower manufacturing cost. The integrated hinge structure can comprise a first board and a second board that can be coupled to each other. Furthermore, the first board is divided into a first turning portion and a second turning portion by an embedded groove hinge. The second turning portion is further detachably connected to the second board. The integrated hinge structure further comprises fixation features to render the constructed assembly stable and durable.

17 Claims, 8 Drawing Sheets

(58) Field of Classification Search
CPC .............. B29C 66/712; B29K 2105/06; B29K 2105/089; F16C 11/12
See application file for complete search history.

(56) References Cited

U.S. PATENT DOCUMENTS

| | | | | | |
|---|---|---|---|---|---|
| 3,516,115 | A * | 6/1970 | Koleske | E05D 1/02 | 16/225 |
| 3,731,449 | A * | 5/1973 | Kephart, Jr. | E04C 2/205 | 52/309.7 |
| 3,782,592 | A * | 1/1974 | Bergh | E05D 7/12 | 220/829 |
| 4,892,189 | A * | 1/1990 | Kunimune | G11B 33/0438 | D6/626 |
| 5,381,920 | A * | 1/1995 | Lin | B25H 3/02 | 16/261 |
| 5,463,794 | A * | 11/1995 | Erland | B29C 53/06 | 16/385 |
| 5,941,412 | A * | 8/1999 | Mahoney | B65D 43/166 | 220/847 |
| 7,887,249 | B2 * | 2/2011 | Schmitz | B64C 9/02 | 52/631 |
| 8,016,153 | B2 * | 9/2011 | Boenig | A45C 13/005 | 220/592.01 |
| 8,881,893 | B1 * | 11/2014 | Cheng | A45C 11/04 | 206/6 |
| 11,333,392 | B1 * | 5/2022 | Eagan | E05D 7/009 | |
| 2002/0133906 | A1 * | 9/2002 | Fedon | E05D 1/02 | 16/225 |
| 2006/0108899 | A1 * | 5/2006 | Jin | A47B 43/00 | 312/107 |
| 2007/0199176 | A1 * | 8/2007 | Mc Clellan | E05D 1/02 | 16/224 |
| 2009/0032545 | A1 * | 2/2009 | Zeiler | B65D 43/169 | 220/833 |
| 2014/0007376 | A1 * | 1/2014 | Brewer | E05D 1/02 | 16/225 |
| 2015/0067983 | A1 * | 3/2015 | Carey | B29C 48/09 | 16/225 |
| 2018/0283065 | A1 * | 10/2018 | Christenson | B32B 5/24 | |

* cited by examiner

INTEGRATED HINGE STRUCTURE FOR PLASTIC BOARDS

CROSS-REFERENCES TO RELATED APPLICATIONS

This application is a continuation of U.S. patent application Ser. No. 17/553,592, entitled "INTEGRATED HINGE STRUCTURE FOR PLASTIC BOARDS" filed Dec. 16, 2021, which claims the benefit of and priority to CN Patent Application No. CN 2021112199302, entitled "HINGED BOARD ASSEMBLY STRUCTURE," filed Oct. 20, 2021, all of which are incorporated herein by reference in their entirety for all purposes.

TECHNICAL FIELD

The present subject matter is in the field of the plastic board assembly. More particularly, embodiments of the present subject matter relate to a screw-free, integrated hinge structure for plastic boards.

BACKGROUND

Many existing furniture are constructed by assembling multiple boards. When two adjacent boards need to be rotatable, e.g., forming a rotatable cover or door, hinges are usually installed between the adjacent panels for enabling the rotation. For example, "Metal Cabinet Shell Panel" disclosed in the Chinese invention patent application with the application number CN202111029049.6 (Publication Number CN113464023A), which includes a stamped and formed door panel that is clamped with the inner frame. There are fastening components arranged on the inner frame, which is fixed to the outer frame through the mounting assembly. Furthermore, the outer frame is hinged to the cabinet body through a hinge. For another example, for a typical storage box, the cover board and the rear board are usually connected by a hinge connection structure, thereby realizing the opening and closing of the cover board. Although the hinge connection structure is relatively strong and reliable, it not only has a complex structure, but also requires hinge installation that is troublesome and time-consuming. In addition, the hinge connection structure usually has metal components with relatively high costs. In summary, the present hinge structure for adjacent boards needs to be further improved.

SUMMARY OF THE INVENTION

The present subject matter can solve the technical problem as described herein by providing an integrated hinge structure that is simple, low-cost, and convenient in view of the present state of the art.

The technical solution of the present subject matter to solve the afore-mentioned technical problems is: an integrated hinge structure for plastic boards that comprises a first board and a second board configured to be coupled to each other, wherein the first board is divided into a first turning portion and a second turning portion by an embedded groove hinge, wherein the embedded groove hinge is located in an inner side of the first board, and wherein the second turning portion is detachably connected to the second board.

The integrated hinge structure can comprise fixation and stabilization features to render the constructed assembly stable and durable According to some embodiments, to enable the two adjacent hinged boards to be perpendicular to each other, the inner side of the first turning portion has a first inclined surface connected with one side of the embedded groove hinge. The inner side of the second turning portion has a second inclined surface connected with the other side of the embedded groove hinge.

When the first turning portion and the second turning portion are perpendicular to each other, the first inclined surface is configured to abut against the second inclined surface to prevent the first turning portion and the second turning portion from collapsing into each other. As such, the first board and the second board can be used for the adjacent, rotatable boards of a box.

According to some embodiments, to enable the two adjacent hinged boards to be perpendicular to each other, both sides of the inner surface of the first turning portion further comprise inwardly extending stopper stripes. Both sides of the inner surface of the second turning portion further comprise stopper bars.

When the first turning portion and the second turning portion are perpendicular to each other, the inwardly extending stopper stripes are configured to abut against the stopper bars to prevent the first turning portion and the second turning portion from collapsing into each other. As such, the stopper stripes and stopper bars can further limit the rotation of the first turning part and the second turning part to form a stable hinged structure.

According to some embodiments, to make the transition coherent between the second turning portion and the second board, the outer side surface of the second turning portion is flush with the outer side surface of the second board.

Preferably, the first board and the second board can both be one-piece plastic boards that are integrally manufactured. The embedded groove hinge that divides the first board into two turning portions can be manufactured by reducing the depth of the plastic material while forming the one-piece first board. The inherently-formed, embedded groove hinge can make the two turning portions rotatable.

Preferably, the first board and the second board can both be square or rectangular boards. The embedded groove hinge can be arranged adjacent to the edge of the first board and disposed along the length direction of the edge, rending the size of the second turning portion much than that of the first turning portion.

To enable the first board and the second board to be detachably coupled, the second turning portion and the second board can be detachably connected. Preferably, the second turning portion and the second board can be detachably connected via their respective receiving sides.

According to some embodiments, the second turning portion is detachably connected to the second board via the coupling of first pins disposed along the length direction on the receiving side of the second turning portion and first sockets disposed along the length direction on the receiving side of the second board. The first pins can be plugged into the corresponding first sockets.

According to some embodiments, the second turning portion is further detachably connected to the second board via the coupling of second sockets disposed along the length direction on the receiving side of the second turning portion and second pins disposed along the length direction on the receiving side of the second board. The second pins can be plugged into the corresponding second sockets.

According to some embodiments, the first pins and the second sockets can be evenly disposed at intervals along the length direction on the receiving side of the second turning portion. The first sockets and the second pins can be evenly disposed at intervals along the length direction on the receiving side of the second board.

According to some embodiments, to fix the position of the second turning portion after being inserted into the second board, the inner wall of the first sockets and the sockets are provided with ribs, whereas the first pins and the second pins are provided with grooves. The ribs are configured to be snapped into the corresponding grooves when the second turning portion is connected to the second board.

Compared with the prior art, the advantages of the present subject matter include creating an embedded groove hinge dividing a first board into a first turning portion and a second turning portion, which are pivotable by the embedded groove hinge. When the first board is coupled to a second board, the second turning portion of the first board is mated with the second board so that the first turning portion of the first board is pivotable or rotatable in relation to the second board by the embedded groove hinge. The embedded groove hinge eliminates the need for a traditional hinge. Without any metal components, the integrated hinge structure is a simple structure with relatively low manufacturing cost. It is particularly useful for connecting two adjacent plastic boards of a box or a cabinet.

Other aspects and advantages of the present subject matter will become apparent from the following detailed description taken in conjunction with the accompanying drawings, which illustrate, by way of example, the principles of the present subject matter.

DESCRIPTION OF DRAWINGS

The present subject matter is illustrated by way of example, and not by way of limitation, in the figures of the accompanying drawings and in which.

DETAILED DESCRIPTION

Figure 1:
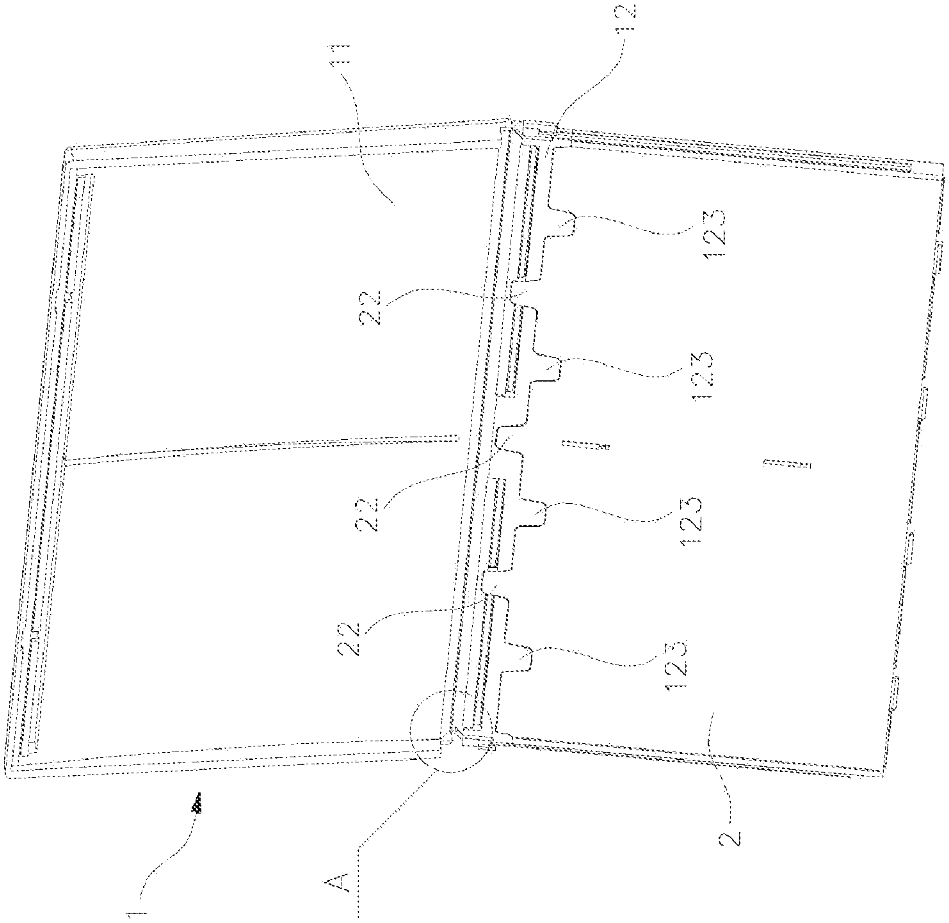
FIG. 1 is a schematic structural diagram of the present subject matter when the first board and the second board are connected and open.
Figure 2:
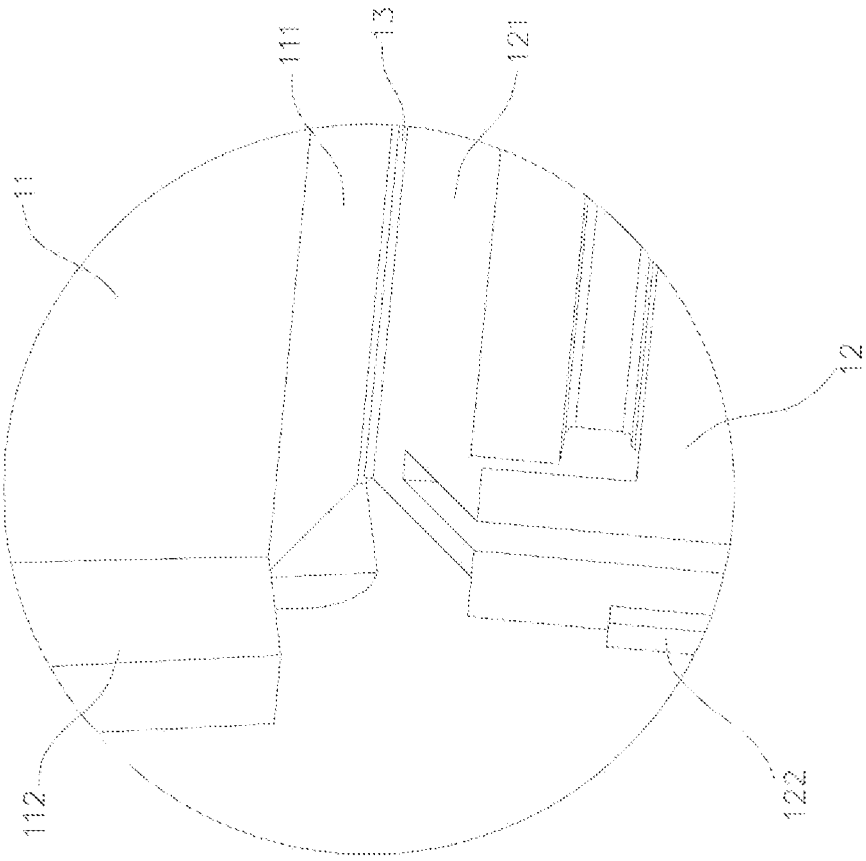
FIG. 2 is an enlarged schematic diagram of part A in FIG. 1.
Figure 3:
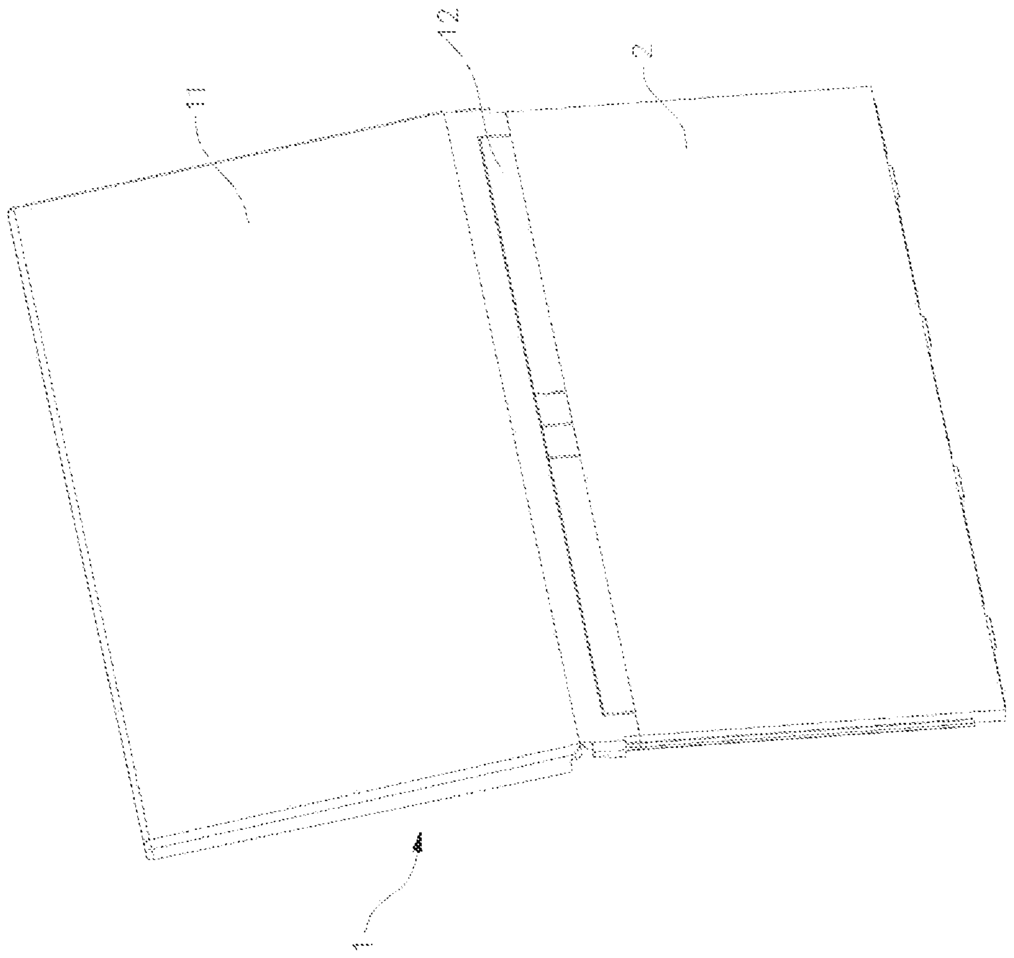
FIG. 3 is a schematic view of FIG. 1 from another angle.

The present subject matter pertains to improved approaches for a screw-free, integrated hinge structure for adjacent plastic boards. Embodiments of the present subject matter are discussed below with reference to FIGS. 1-8.

In the following description, for purposes of explanation, numerous specific details are set forth in order to provide a thorough understanding of the present subject matter. It will be apparent, however, to one skilled in the art that the present subject matter may be practiced without some of these specific details. In addition, the following description provides examples, and the accompanying drawings show various examples for the purposes of illustration. Moreover, these examples should not be construed in a limiting sense as they are merely intended to provide examples of embodiments of the subject matter rather than to provide an exhaustive list of all possible implementations. In other instances, well-known structures and devices are shown in block diagram form in order to avoid obscuring the details of the disclosed features of various described embodiments.

As shown in FIGS. 1 to 6, the integrated hinge structure of the present subject matter comprises a first board 1 and a second board 2 coupled with each other. Each of the first board 1 and second board 2 can be a one-piece plastic component. According to some embodiments, both boards can be blow-molded plastic plates. According to some embodiments, both boards can be square boards.

According to some embodiments, an embedded groove hinge 13 can be inherently formed on the inner side of the first board 1 by reducing the plastic material when manufacturing the board. By dividing the first board 1 into a first turning portion 11 and a second turning portion 12, the embedded groove hinge 13 renders the two turning portions rotatable by the hinge. The embedded groove hinge 13 can have two openings respectively located on opposite sides of the first board 1. According to some embodiments, the embedded groove hinge 13 can be adjacent to the edge of the first board 1 and distributed along the length of the edge. According to some embodiments, the embedded groove hinge 13 can be located near or at the center of the first board 1. As such, the first board 1 can be divided into a first turning portion 11 and a second turning portion 12 that can be pivotable with each other by the embedded groove hinge 13 as a divider, wherein the second turning portion 12 can be inserted, coupled or connected to the second board 2.

According to some embodiments, the inner side of the first turning portion 11 can have a first inclined surface 111 connected with one side of the embedded groove hinge 13. The inner side of the second turning portion 12 can have a second inclined surface 121 connected with the other side of the embedded groove hinge 13. According to some embodiments, both sides of the inner surface of the first turning portion 11 can further comprise inwardly extending stopper stripes 112. Both sides of the inner surface of the second turning portion 12 can further comprise stopper bars 122.

Figure 4:
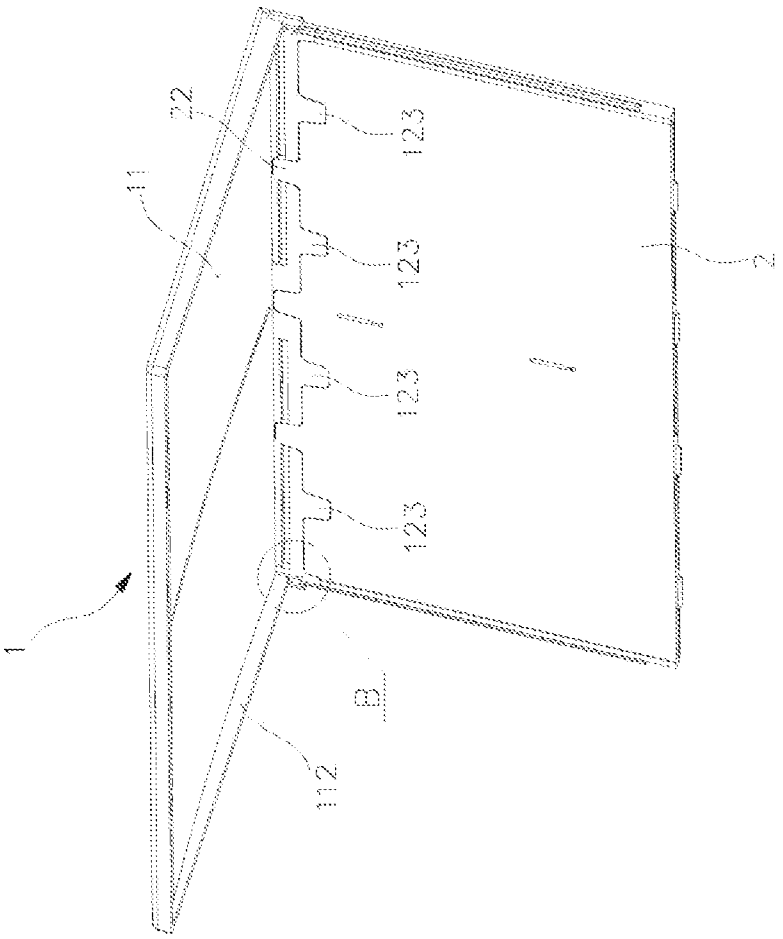
FIG. 4 is a schematic diagram of the present subject matter when the first board and the second board are connected and closed.
Figure 5:
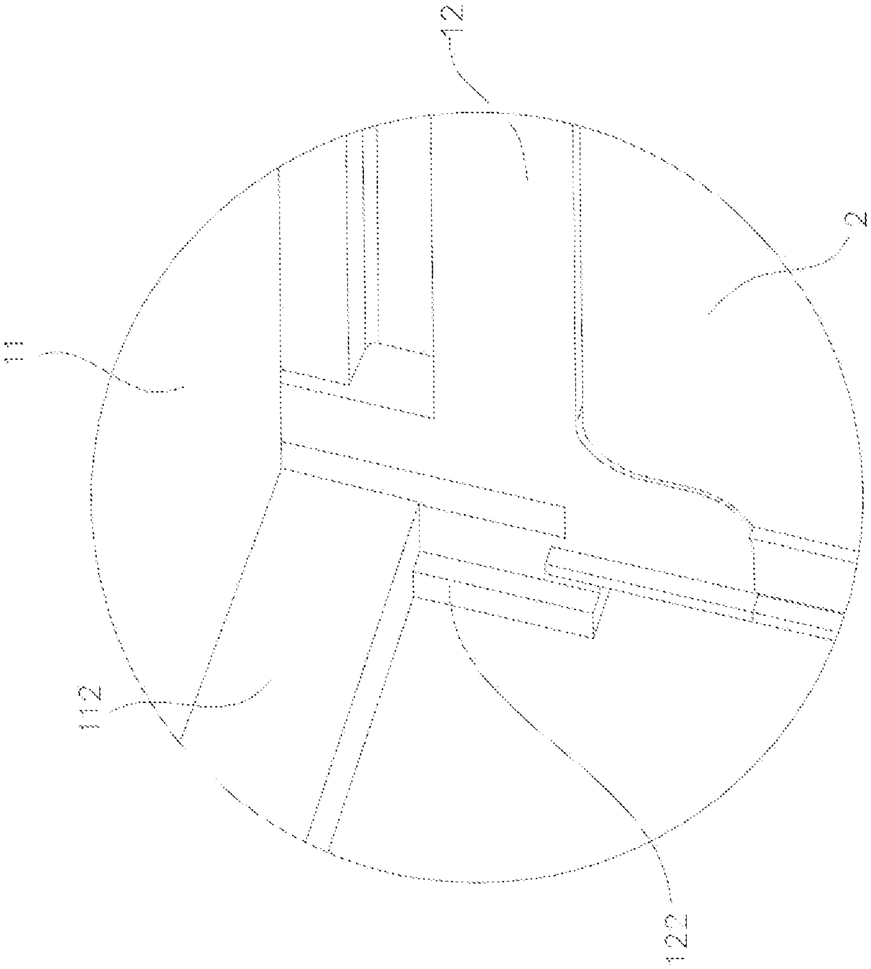
FIG. 5 is an enlarged schematic diagram of part B in FIG. 4.
Figure 6:
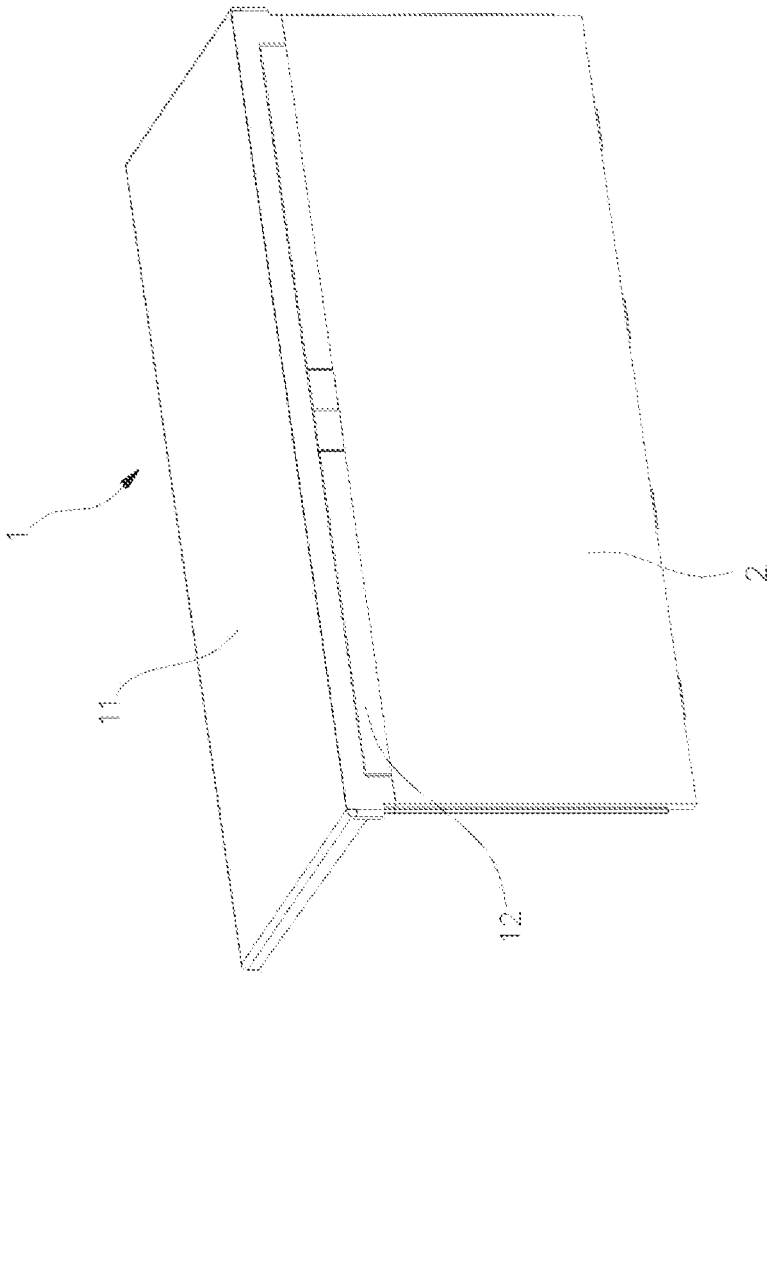
FIG. 6 is a schematic view of FIG. 4 from another angle.

As shown in FIGS. 4-6, when the first turning portion 11 and the second turning portion 12 are perpendicular to each other, the first inclined surface 111 can abut against the second inclined surface 121 so that the first turning portion 11 and the second turning portion 12 do not collapse into each other. Similarly, the inwardly extending stopper stripes 112 can abut against the stopper bars 122 to prevent the first turning portion 11 and the second turning portion 12 from collapsing into each other. As such, the first turning portion 11 and the second turning portion 12 can maintain to be perpendicular to each other at the closed position.

According to some embodiments, the second turning portion 12 can be detachably connected to the second board 2. Specifically, the second turning portion 12 and the second board 2 can be coupled or mated with each other through their respective receiving or butting sides.

Figure 7:
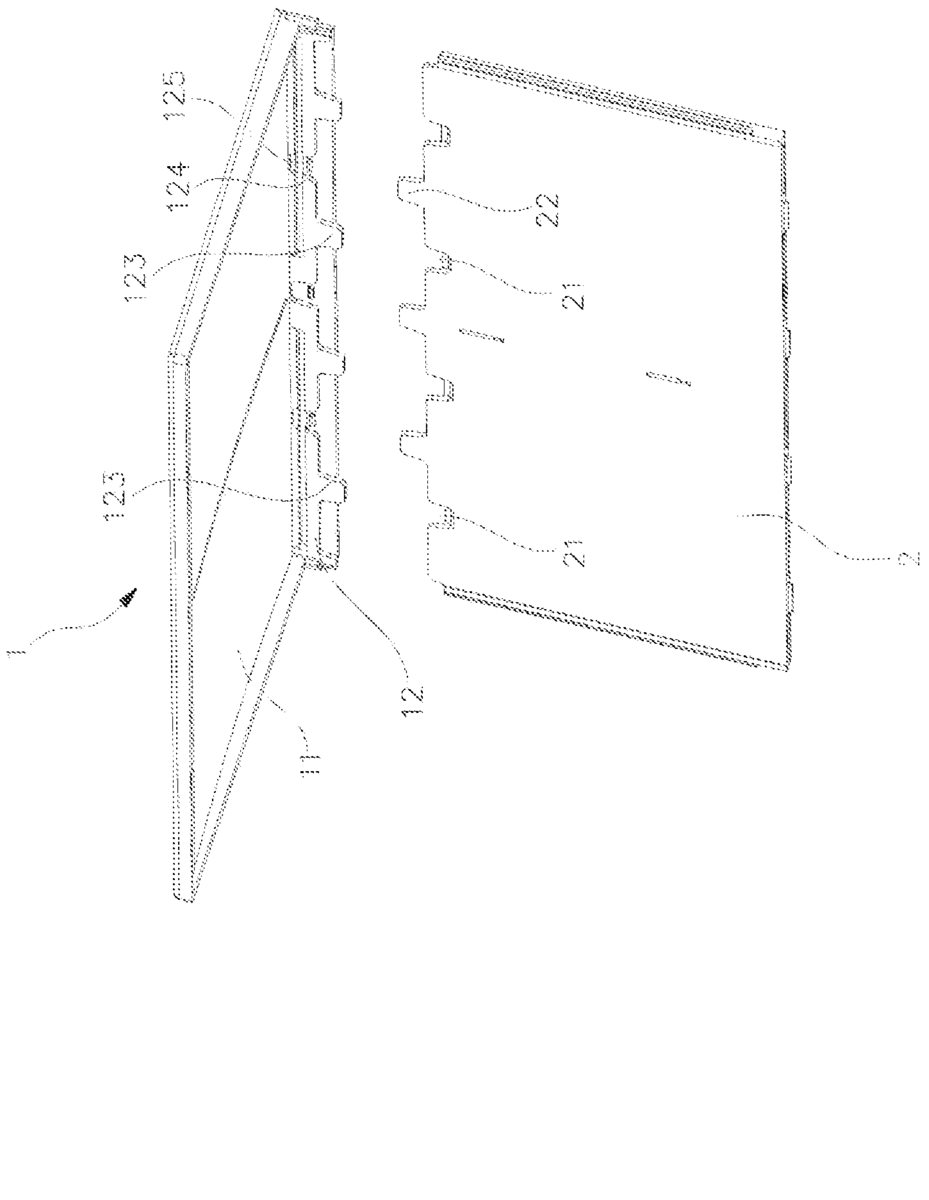
FIG. 7 is an exploded schematic diagram of the present subject matter when the first board and the second board are disconnected.
Figure 8:
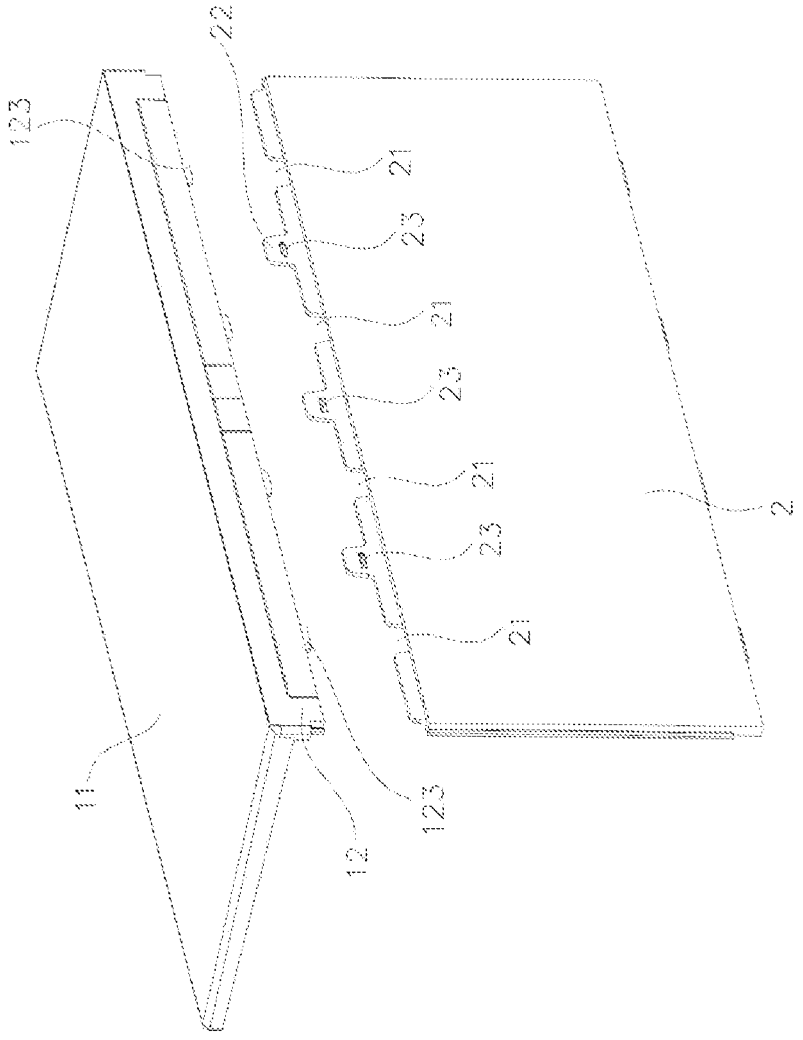
FIG. 8 is a schematic diagram of FIG. 7 from another angle.

As shown in FIGS. 7 and 8, the second turning portion 12 can be detachably connected to the second board 2 via the coupling of first pins 123 and first sockets 21, wherein the first pins 123 are configured to be plugged into the corresponding first sockets 21. The first pins 123 can be disposed along the length direction on the receiving side of the second turning portion 12. The first sockets 21 can be disposed along the length direction on the receiving side of the second board 2.

Furthermore, the second turning portion 12 can be further detachably connected to the second board 2 via the coupling of second sockets 124 and second pins 22, wherein the second pins 22 are configured to be plugged into the corresponding second sockets 124. The second sockets 124 can be disposed along the length direction on the receiving side of the second turning portion 12. The second pins 22 can be disposed along the length direction on the receiving side of the second board 2.

According to some embodiments, the first pins 123 and the second sockets 124 can be evenly disposed at intervals along the length direction on the receiving side of the second turning portion 12. The first sockets 21 and the second pins 22 can be evenly disposed at intervals along the length direction on the receiving side of the second board 2.

Furthermore, the inner wall of the first sockets 21 and the second sockets 124 can be provided with ribs 125. The first pins 123 and the second pins 22 can be provided with grooves 23. When the second turning portion 12 is mated or coupled to the second board 2, the ribs 125 can be snapped into the corresponding grooves 23 to prevent detachment of the two coupled components.

According to some embodiments, to make the transition coherent between the second turning portion 12 and the second board 2, the outer side surface of the second turning portion 12 can be flush with the outer side surface of the second board 2.

It is to be understood that even though numerous characteristics and advantages of various embodiments of the present subject matter have been set forth in the foregoing description, together with details of the structure and function of various embodiments of the subject matter, this disclosure is illustrative only. In some cases, certain subassemblies are only described in detail with one such embodiment. Nevertheless, it is recognized and intended that such subassemblies may be used in other embodiments of the subject matter. Practitioners skilled in the art will recognize many modifications and variations. Changes may be made in detail, especially matters of structure and management of parts within the principles of the embodiments of the present subject matter to the full extent indicated by the broad general meaning of the terms in which the appended claims are expressed.

Having disclosed exemplary embodiments and the best mode, modifications and variations may be made to the disclosed embodiments while remaining within the scope of the embodiments of the subject matter as defined by the following claims.

What is claimed is:

1. An integrated hinge structure for plastic boards, comprising:

a first board (1) and a second board (2) configured to be coupled to each other, wherein the first board (1) is divided into a first turning portion (11) and a second turning portion (12) by an embedded groove hinge (13), wherein the embedded groove hinge (13) is in an inner side of the first board (1); and wherein the second turning portion (12) is detachably connected to the second board (2) via the coupling of first pins (123) on a receiving side of the second turning portion (12) and first sockets (21) on a receiving side of the second board (2) and the coupling of ribs (125) on the second turning portion (12) and corresponding grooves (23) on the second board (2).

2. The integrated hinge structure of claim 1, wherein the inner side of the first turning portion (11) has a first inclined surface (111) connected with one side of the embedded groove hinge (13), and wherein the inner side of the second turning portion (12) has a second inclined surface (121) connected with the other side of the embedded groove hinge (13).

3. The integrated hinge structure of claim 2, wherein the first inclined surface (111) is configured to abut against the second inclined surface (121) to prevent the first turning portion (11) and the second turning portion (12) from collapsing into each other when the first turning portion (11) and the second turning portion (12) are perpendicular to each other.

4. The integrated hinge structure of claim 1, wherein the left and right sides of the inner surface of the first turning portion (11) further comprise inwardly extending stopper stripes (112), and wherein the left and right sides of the inner surface of the second turning portion (12) further comprise stopper bars (122).

5. The integrated hinge structure of claim 4, wherein the inwardly extending stopper stripes (112) are configured to abut against the stopper bars (112) to prevent the first turning portion (11) and the second turning portion (12) from collapsing into each other when the first turning portion (11) and the second turning portion (12) are perpendicular to each other.

6. The integrated hinge structure of claim 1, wherein each of the first board (1) and the second board (2) is a one-piece plastic board.

7. The integrated hinge structure of claim 1, wherein the embedded groove hinge (13) is adjacent to a lower edge of the first board (1) and disposed along the length direction of the edge.

8. The integrated hinge structure of claim 1, wherein the second turning portion (12) is detachably connected to the second board (2) via their respective receiving sides.

9. The integrated hinge structure of claim 8, wherein the first pins (123) are disposed along the length direction on the receiving side of the second turning portion (12) and the first sockets (21) are disposed along the length direction on the receiving side of the second board (2), wherein the first pins (123) are configured to be plugged into the corresponding first sockets (21).

10. The integrated hinge structure of claim 9, wherein the second turning portion (12) is further detachably connected to the second board (2) via the coupling of second sockets (124) disposed along the length direction on the receiving side of the second turning portion (12) and second pins (22) disposed along the length direction on the receiving side of the second board (2), wherein the second pins (22) are configured to be plugged into the corresponding second sockets (124).

11. The integrated hinge structure of claim 10, wherein the first pins (123) and the second sockets (124) are evenly disposed at intervals along the length direction on the receiving side of the second turning portion (12), and wherein the first sockets (21) and the second pins (22) are evenly disposed at intervals along the length direction on the receiving side of the second board (2).

12. The integrated hinge structure of claim 11, wherein the inner wall of the first sockets (21) and the second sockets (124) are provided with ribs, and the first pins (123) and the second pins (22) are provided with grooves, and wherein the ribs are configured to be snapped into the corresponding grooves when the second turning portion (12) is connected to the second board (2).

13. An integrated hinge structure for plastic boards, comprising:

a first board (1) and a second board (2) configured to be coupled to each other, wherein the first board (1) is divided into a first turning portion (11) and a second turning portion (12) by an embedded groove hinge (13), wherein the embedded groove hinge (13) is in an inner side of the first board (1); and wherein the second turning portion (12) is detachably connected to the second board (2) via their respective receiving sides via the coupling of first pins (123) on the receiving side of the second turning portion (12) and first sockets (21) on the receiving side of the second board (2) and the coupling of ribs (125) on the second turning portion (12) and corresponding grooves (23) on the second board (2).

14. The integrated hinge structure of claim 13, wherein the second turning portion (12) is detachably connected to the second board (2) via the coupling of first pins (123) disposed along the length direction on the receiving side of the second turning portion (12) and first sockets (21) disposed along the length direction on the receiving side of the second board (2), wherein the first pins (123) are configured to be plugged into the corresponding first sockets (21).

15. The integrated hinge structure of claim 14, wherein the second turning portion (12) is further detachably connected to the second board (2) via the coupling of second sockets (124) disposed along the length direction on the receiving side of the second turning portion (12) and second pins (22) disposed along the length direction on the receiving side of the second board (2), wherein the second pins (22) are configured to be plugged into the corresponding second sockets (124).

16. The integrated hinge structure of claim 15, wherein the first pins (123) and the second sockets (24) are evenly disposed at intervals along the length direction on the receiving side of the second turning portion (12), and wherein the first sockets (21) and the second pins (22) are evenly disposed at intervals along the length direction on the receiving side of the second board (2).

17. The integrated hinge structure of claim 16, wherein the inner wall of the first sockets (21) and the sockets (124) are provided with ribs, and the first pins (123) and the second pins (22) are provided with grooves, and wherein the ribs are configured to be snapped into the corresponding grooves when the second turning portion (12) is connected to the second board (2).

* * * * *